(No Model.) 2 Sheets—Sheet 1.
J. RICHARD.
RECORDING APPARATUS FOR BAROMETERS, &c.
No. 334,613. Patented Jan. 19, 1886.
Fig. 1.
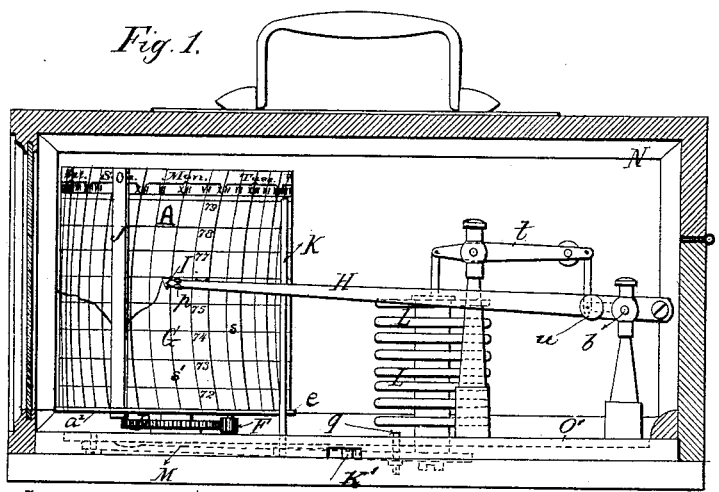
Fig. 2ª.
Fig. 2.
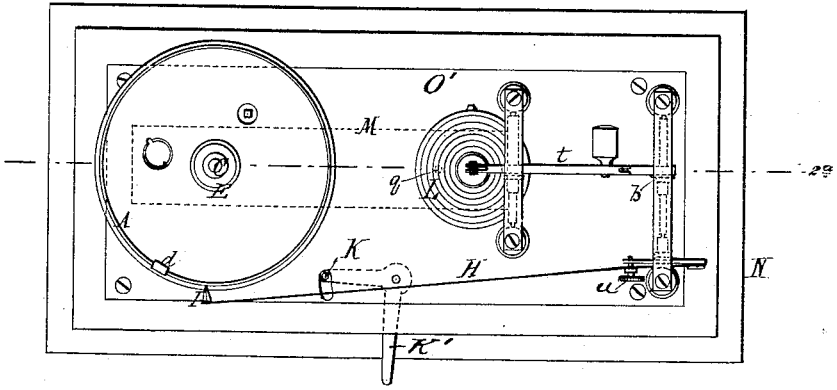
Fig. 3.    Fig. 4.    Fig. 5.    Fig. 6.
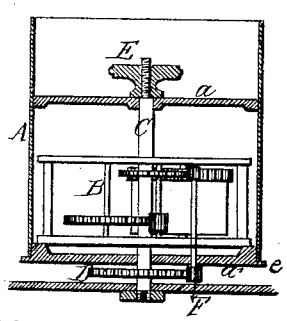 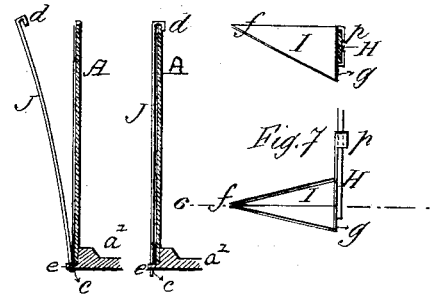
Fig. 7.
WITNESSES:
Geo. H. Fraser.
Geo. Dainton
INVENTOR:
Jules Richard
By his Attorneys,
Burke, Fraser & Connell (No Model.)  2 Sheets—Sheet 2.
J. RICHARD.
RECORDING APPARATUS FOR BAROMETERS, &c.

No. 334,613. Patented Jan. 19, 1886.

WITNESSES:
Geo. H. Fraser.
Geo. Bainton

INVENTOR:
Jules Richard
By his Attorneys,
Burke, Fraser & Connett

United States Patent Office.

JULES RICHARD, OF PARIS, FRANCE, ASSIGNOR TO THE SOCIÉTÉ RICHARD FRÈRES, OF SAME PLACE.

RECORDING APPARATUS FOR BAROMETERS, &c.

SPECIFICATION forming part of Letters Patent No. 334,613, dated January 19, 1886.

Application filed October 30, 1885. Serial No. 181,423. (No model.) Patented in France August 26, 1880, No. 139,070.

*To all whom it may concern:*

Be it known that I, JULES RICHARD, a citizen of the French Republic, and a resident of Paris, France, have invented certain Improvements in Recording-Instruments for Barometers, &c., (for which a patent has been granted in France, dated August 26, 1880, No. 139,070,) of which the following is a specification.

My instrument is especially useful for recording automatically the fluctuations in barometers, thermometers, anemometers, manometers, and other instruments of this character; and my invention relates to that class of recorders wherein the paper on which the record is made is carried on a drum which is revolved by a clock-train, and wherein the instrument whose fluctuations are to be recorded carries a pen or other marking-instrument, which is held in contact with the paper.

The novel features of my invention consist mainly, in the means whereby the errors, if any, in the record of the instrument as compared with a standard instrument may be corrected.

All of the novel features will be hereinafter fully described, and carefully defined in the claims.

Figure 8:
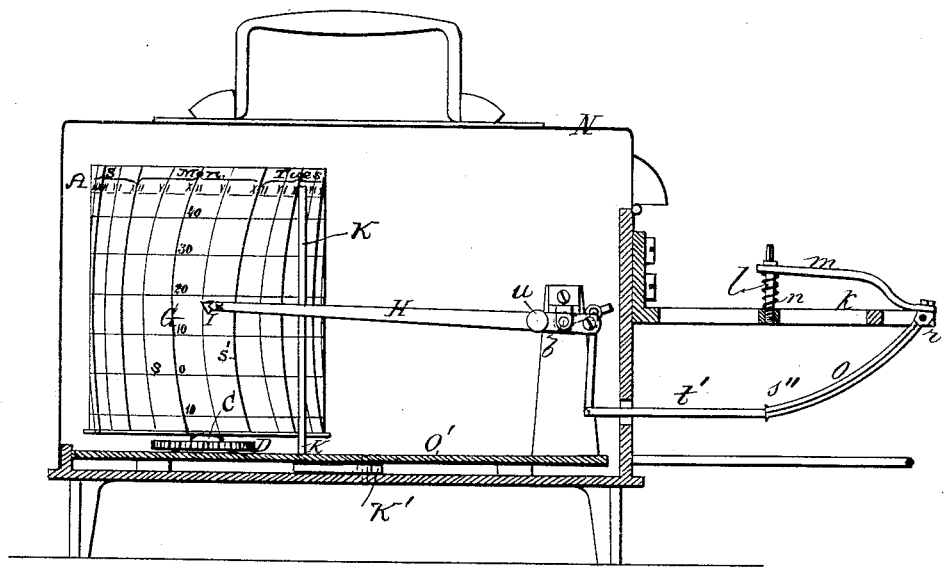
Figure 9:
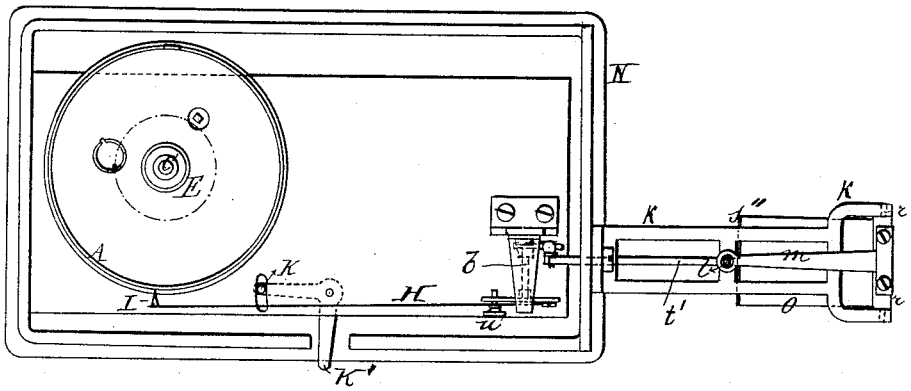

Figures 1 and 2 illustrate the application of my recording apparatus to an aneroid barometer. Fig. 1 is a side elevation of the apparatus complete with the exterior casing in section, and Fig. 2 is a plan of the same with the exterior casing removed. Fig. 2ª is a longitudinal vertical section through the base of the apparatus on line 2ª 2ª in Fig. 2. Fig. 3 is a longitudinal axial section of the recorder-drum. Figs. 4 and 5 are detached views illustrating the spring-clamp for holding the paper fast on the recorder-drum, the former showing the clamp loosened from the drum, and the latter showing it in place and clamping the paper into the drum. Figs. 6 and 7 are respectively a vertical section and a plan of the pen, shown on a much larger scale than the other figures. The section in which Fig. 6 is taken is indicated by the line 6 6 in Fig. 7. Figs. 8 and 9 are views of the same character, respectively, as Figs. 1 and 2, but illustrate the application of my apparatus to a Bourdon tube-thermometer.

Referring to the first seven figures, A is the recorder-drum provided with two heads, $a$ and $a'$, and rotatively mounted on a fixed axis, C. The milled nut E keeps the drum in place on the axis C, yet allows it to be readily slipped off by removing said nut.

B is the clock-train, which is mounted in the drum on its head $a'$, and drives a satellite pinion, F, which is mounted exteriorly on an arbor which projects from the train through head $a'$. This pinion F meshes with a spur-wheel, D, fixed on the axis C, and thus through the rotation of the pinion the drum is rotated on its axis C. This construction has the advantage that the drum and clock-train may be removed at any time and in a moment by simply removing nut E. By reason of this construction, also, if the wheels D and F be constructed as change-wheels, varying rotative speeds may at will be imparted to the drum. To effect this will require no more than the ordinary skill of a mechanic.

G is the sheet of paper to be wound on the drum to receive the record. This sheet is fixed to the drum by lapping its two meeting edges one over the other and clamping it by the novel spring-clamp J. (Illustrated best in Figs. 4 and 5.) This clamp is made of a thin elastic plate, preferably of metal, one end of which passes through a rectangular aperture or mortise, $c$, in the projecting flange $e$ of the drum A, and the other end of which has a hook, $d$, which takes over the upper edge of the drum. The hook is made to engage by pushing the spring-clamp endwise. The spring-clamp is curved normally, as seen in Fig. 4, with its convex face next the drum, whereby, when it is brought down flat, as seen in Fig. 5, it will be under some tension and will clamp the paper down firmly upon the drum.

I am aware that a hinged bar with a spring-latch at its end and perforated for the passage of pins fixed in the drum has been employed for securing the paper on the drum of a recording-instrument, and this I do not claim.

My spring-clamp is not connected to the drum by a hinge, but has end-play, as described. When the drum has completed one revolution, the paper bearing the record is taken off and replaced by a fresh sheet.

I have shown the drum arranged to revolve once in a week, and have shown the paper furnished with parallel lines $s$, which measure the degree of fluctuation of the barometer. These lines extend lengthwise of the paper and around the drum. The paper is also provided with curved parallel lines $s'$, which extend lengthwise of the drum and serve to mark divisions of time. They are curved for the reason that the marking-pen (which will be hereinafter described) moves in a curve in recording the fluctuations. The curve of lines $s'$ corresponds to that of the path traversed by the pen.

I is the pen, which is fixed to the free end of an arm, H, pivoted at $b$ to a suitable support. The arm H is elastic and keeps the pen I pressed up against the paper on the drum. This pressure is, or may be, regulated by means of an adjusting-screw, $u$.

L is an aneroid barometer, made up of a number of "shells" or drum-like parts connected together, as shown, and mounted on a base. The uppermost disk or plate of the top shell will rise and fall under the influence of fluctuations in the atmospheric pressure to an extent equal to the sum of the movements caused by expansion and contraction of all the shells. The uppermost disk of the barometer is connected to the arm H of the pen through the medium of a rock-lever, $t$, one end of which is coupled by a link to the barometer-disk, and the other end by a link to an arm on the pen-axis, or it may be to the pen-arm itself. Thus it will be seen that any rise of the uppermost disk of the barometer will depress the pen, while any fall of the barometer-disk will cause the pen to rise. The pen may be raised from the surface of the paper by means of a rod, K, the lower end of which is fixed to an elbow-lever, K', mounted in the base of the apparatus with its operating-arm projecting, as clearly shown in Fig. 2.

N is the casing or box which incloses the instrument. It may have glass sides, as indicated in Fig. 1.

In the course of time a change will take place in the metal of the barometer which will render it incorrect by the displacement of the zero-point on the scale as compared with a standard—that is to say, the barometer will mark correctly the fluctuations, but the record will be above or below the proper point. To correct this I provide means for raising and lowering the barometer as a whole until the pen stands at the proper elevation at a given time when tested by a standard. In the bottom of the case is a plate, O', upon which is mounted all of the mechanism of the instrument, except the barometer L. On the under side of this plate O' is mounted (see Fig. 2ª) at its one end a spring-plate, M, on the free end of which is mounted the barometer L. This plate is provided with an adjusting and set screw, $q$, whereby its free end may be adjusted up and down a little, so as to raise and lower the barometer with respect to the remainder of the mechanism. The screw $q$ operates in a well-known way and will need no further description.

The pen I, which serves to trace the line on the paper in recording, is clearly illustrated in Figs. 6 and 7. It is in the form of an inverted pyramid constructed hollow to retain ink. I construct it by bending up a plate of thin sheet metal. The vertical face $g$ is provided with suitable clips, which embace and clasp a handle or stem, $p$, that forms the extremity of the arm H. The pen may be readily slipped on or off the arm. The point $f$ of the pen is slitted down in the line of the lower angle in order to cause a flow of ink as in an ordinary pen. I usually employ an aniline ink mixed with a little glycerine to prevent it from drying, and a drop or two in the hopper-like hollow of the pen will suffice.

As stated before, Figs. 8 and 9 illustrate the application of my improved drum and pen to record the fluctuations of a thermometer. The thermometer shown is that known as the "Bourdon," which employs a curved and flattened metallic tube. This tube is filled with alcohol and hermetically closed. The dilatation of the alcohol changes the curvature of the tube. The drum and pen are the same as those previously described.

O is the curved and flattened tube, which is attached at its one end, $r$, to a bracket-plate, $k$, mounted on the casing of the apparatus. The free end $s''$ of the tube changes its position in accordance with the changes of temperature, and it is only necessary to measure and record these changes. This I effect by means of my improved mechanism. A rod, $t'$, made fast to the end $s''$ of the tube O to prolong the latter, is coupled by a link to an arm on the axis $b$ of the pen-arm H. Thus the movements of the extremity $s''$ of tube O are magnified and communicated to the pen in a way that will be well understood.

The object in placing the thermometer-tube O exterior to the casing N is that it may record the temperature exterior to the casing.

In order to be able to set the pen I to the zero-line on the drum when the temperature is at zero in the primary adjustment and to correct any error that may in course of time arise from molecular movements in the metal of the tube O, I pivot the end $r$ of the tube O in the bracket-plate $k$ and rigidly fix to it an arm, $m$, the free end of which takes under a collar on a screw-stud, $l$, which screws into plate $k$. A spring, $n$, is arranged between plate $k$ and arm $m$. By turning this screw the pen may be adjusted up or down, as described, and thus brought to coincide with the proper line on the drum, as determined, for example, by a standard thermometer.

My recording apparatus may be as well applied to psychrometers, hygrometers, manometers, evaporometers, vacuum-indicators, pluviometers, submerged thermometers, statoscopes, tube or ball actinometers, pyrometers, &c.

I have herein given two of the more important of its applications.

Having thus described my invention, I claim—

1. The combination, with the recording-drum, the pen, and its lever-like arm, and the mechanism, substantially as described, for coupling the pen-arm to the instrument whose movements are to be recorded, of the said instrument, and means, substantially as described, for adjusting the position of the said instrument with respect to the drum, whereby the error in the instrument, if any, may be corrected, substantially as set forth.

2. The combination, with the drum A, the recording-pen, and its arm, the mechanism, substantially as described, for communicating the motion of the barometer to the pen, and the plate O' on which the above-named parts are mounted, of the barometer L, the spring-plate M, on which said barometer is mounted, and the screw $q$, for adjusting the spring-plate M, substantially as and for the purpose set forth.

3. The combination, with the drum A, provided with a mortise in its flange to receive the end of the normally curved and elastic spring-clamp J, of the said clamp J, constructed to play longitudinally through said mortise, and provided with a hook, $d$, to engage the drum-margin, whereby said hook may be engaged and disengaged by the longitudinal movement of the clamp, as set forth.

In witness whereof I have hereunto signed my name in the presence of two subscribing witnesses.

JULES RICHARD.

Witnesses:
ROBT. M. HOOPER,
AMAND RITTER.